United States Patent
Walsh

[11] 3,888,185
[45]* June 10, 1975

[54] HIGH SPEED TRANSPORTATION SYSTEM

[76] Inventor: Robert Walsh, 3025 Cleveland Ave., N.W., Washington, D.C. 20008

[*] Notice: The portion of the term of this patent subsequent to Nov. 27, 1990, has been disclaimed.

[22] Filed: Aug. 14, 1973

[21] Appl. No.: 388,161

Related U.S. Application Data

[63] Continuation-in-part of Ser. No. 190,765, Oct. 20, 1971, Pat. No. 3,774,542.

[52] U.S. Cl.............................. 104/89; 104/148 LM
[51] Int. Cl.² ............................................ B61B 3/02
[58] Field of Search....... 104/89, 94, 23 R, 148 LM, 104/148 SS

[56] References Cited
UNITED STATES PATENTS

| | | | |
|---|---|---|---|
| 3,444,823 | 5/1969 | Akmentin | 104/89 |
| 3,559,583 | 2/1971 | Chadenson | 104/89 |
| 3,577,929 | 5/1971 | Onoda et al. | 104/148 LM |
| 3,611,944 | 10/1971 | Reder | 104/148 LM |
| 3,717,103 | 2/1973 | Guderjahn | 104/148 SS |
| 3,774,542 | 11/1973 | Walsh | 104/89 |

*Primary Examiner*—Lloyd L. King
*Assistant Examiner*—Reinhard J. Eisenzopf
*Attorney, Agent, or Firm*—Larson, Taylor & Hinds

[57] ABSTRACT

A transportation system is provided which includes an elevated trackway formed by tubular track members which extend along the right of way to be traversed, and each including a longitudinal slot in which sleds or runners are slidingly received. Individual vehicles of a train are suspended from the sleds so that vehicles can move along the trackway. Motive power is provided both by jets and a linear induction motor system, with one or the other being used under normal conditions depending on the circumstances. The linear induction motor preferably includes a rotor in the form of a conductive reaction rail which extends parallel to the trackway along the right of way and a dual or two-part stator affixed by a yoke to the vehicle and having the two parts thereof mounted on opposite sides of the reaction rail.

8 Claims, 2 Drawing Figures

HIGH SPEED TRANSPORTATION SYSTEM

CROSS REFERENCES TO RELATED APPLICATIONS

This application is a continuation-in-part of copending application Ser. No. 190,765, filed on Oct. 20, 1971 now U.S. Pat. No. 3,774,542, issued on Nov. 27, 1973.

FIELD OF THE INVENTION

The present invention relates to a transportation system suitable for fast transportation between large urban centers.

BACKGROUND OF THE INVENTION

In copending application Ser. No. 190,765, filed on Oct. 20, 1971, I described a transportation system comprising a trackway formed by at least two generally tubular track members having a longitudinal slot in the underside thereof extending the length of the member, the track member being supported a suitable distance above the earth's surface. Elongated slidable sled members are disposed within the slot in the track members for longitudinal sliding movement along the trackway with at least one vehicle being suspended from the sled members. The vehicle or vehicles, which may comprise a locomotive and a series of vehicles in a train, are propelled by jets and, hence, the vehicles suspended from the track from the sliding sleds move along the track by means of the propulsive forces generated by the jets. The system of my earlier application includes a number of important features and attention is directed to that application, which is hereby incorporated by reference, for a more detailed description of the system.

SUMMARY OF THE INVENTION

In accordance with the present invention, a linear induction propulsion arrangement is provided as an additional motive force for the locomotive, and/or the individual vehicles of the train, of the system of the earlier application. The linear induction propulsion system, particularly where used alone, provides a number of advantages. For example, such a propulsion system provides a reduction in noise level and eliminates or substantially reduces ecology problems associated with jet propulsion. The two means of motive power for the system vehicles, viz., the jet engines referred to in my earlier application and the linear induction propulsion arrangement of the invention, can advantageously be used together in combination, or can be used separately depending on the objectives to be met and the surrounding circumstances. For example, the linear induction system could be utilized to advantage in heavily populated areas or in urban or suburban areas and the jet engines in open areas or the like where noise and ecological problems are of less concern. Further, the two systems can be used together where loads or other conditions warrant the use of both forces.

According to a preferred embodiment thereof, the transportation system of the invention includes a trackway comprising at least two substantially tubular track members extending along the length of the right of way to be traversed and each including a longitudinal slot in the underside thereof which extends the length of the trackway, a support arrangement for supporting the track a predetermined distance above the earth's surface; at least one elongate sled or runner member slidingly disposed within the track for longitudinal movement therein; a vehicle supported from the sled member; and a linear induction motor device for propelling the vehicle along the track. As stated, the vehicle can also include a jet propulsion device for propelling the vehicle along the track and the two propulsion devices can be selectively energized so that one or the other, or both, can be used depending on the circumstances.

The linear induction motor propulsion device preferably comprises a reaction rail which extends along the length of the trackway parallel thereto and is supported by the track supporting arrangement, and a stator rigidly affixed to the vehicle and preferably comprising a pair of stator parts mounted on opposite sides of the reaction rail.

Other features and advantages of the invention will be set forth in, or apparent from, the detailed description of a preferred embodiment found hereinbelow.

DESCRIPTION OF THE PREFERRED EMBODIMENTS

Figure 1:
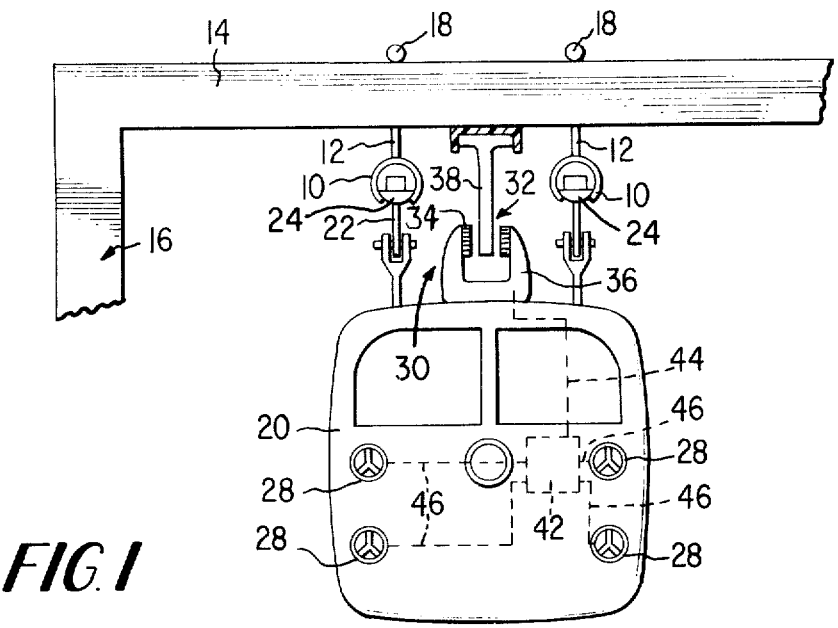
FIG. 1 is a highly schematic and elevational view of a portion of a transportation system in accordance with the invention.

Referring to FIG. 1, a portion of transportation system is provided which includes a plurality of tracks or track members 10, two such track members being shown in the embodiment illustrated. The track members 10 are cylindrical in shape and extend along the right of way to be traversed. Track members 10 are supported a suitable distance above the right of way by rods 12 which are suspended from cables 18 which are strung between transverse bridging members, a portion of one of which, denoted 14, is shown in FIG. 1. Bridging members 14 are themselves supported at each end thereof by tower structures, a portion of one of which is indicated at 16. The bridging members 14 and their supporting tower structures 16 are positioned at suitable intervals along the right of way.

Figure 2:
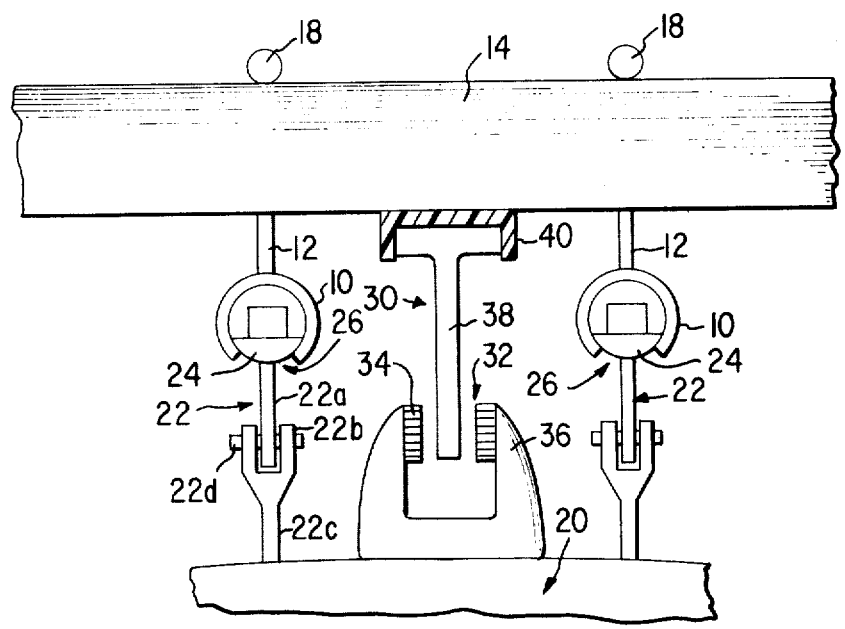
FIG. 2 is a partially broken away detail of the embodiment of FIG. 1.

A train of vehicles, one of which, denoted 20, as illustrated, is suspended from the tracks 10 by supports indicated at 22. Supports 22 are rigidly secured to the vehicle 20 at their lower ends and are secured at their upper ends to a specially shaped sled or runner 24. Tubular track members 10 each include a longitudinal slot 26 therein (see FIG. 2) and sleds or runners 24 have a lower surface which confoims in shape to inner lower surface of track members 10 except in the area of depending supports 22, the latter, as illustrated, extending through slot 26. Support members preferably include an arrangement for providing a limited swinging movement, and to this end, as can best be seen in FIG. 2, a tongue formed in the bottom of the upper portion 22a is received in a U-shaped bifurcated portion 22b of the lower portion 22c of support member 22. A pin 22d extending through the tongue of upper portion 22a and U-shaped portion 22b of lower portion 22c provides relative pivoting movement between the two portions of support member 22 and hence between runner 24 and vehicle 22.

The system described thus far corresponds to that set forth in my copending application Ser. No. 190,765, referred to above, and reference is made to that application for further details of the system.

As provided for in my earlier application, in a preferred embodiment, the vehicle 20 is to be propelled, at least under certain operating conditions, by jet propulsion and a series of jets 28 are located on opposite sides thereof. Jets 28 are preferably arranged in tiers and are spaced so as to distribute their weight. Insofar as possible, jets 28 should be placed so as to avoid interference with one another, as illustrated. Such an arrangement reduces frontal resistance and is a very important factor in achieving high speeds.

According to the invention, as mentioned above, the motive force provided by jets 28 is augmented, and, in certain instances, replaced by the motive force generated by a linear inductive propulsion system indicated at 30. Propulsion system 30 includes a linear induction motor 32 comprising a pair of opposed stators or stator parts 34 rigidly mounted on vehicle 20 by a yoke 36 and disposed on opposite sides of an elongate linear induction motor reaction rail 38. Reaction rail 38, which is preferably constructed of a nonmagnetic conducting material such as aluminum or manganese steel, is mounted on bridging members 14 and extends along the length of the right of way parallel to tracks 10. Reaction rail 38 is insulated from bridging members 14 by suitable means as indicated at 40. The details of construction of the linear induction motor 32 form no part of the present invention and reference is made to the text "Propulsion Without Wheels", by Eric Roberts Laithwaite, published in 1966, by English University Press Limited, and U.S. Pat. Nos. 3,356,041 (Bliss) and 3,611,944 (Reder), among many others, for a further description of linear induction motors of the general type under consideration.

As is indicated schematically in FIG. 1, a control console 42 is provided for the vehicle operator. A connection 44 between console 42 and the stators 34 of linear induction motor 32 controls energization and de-energization of the stator coils by an alternating current which produces the traveling magnetic field in the stator. Connections 46 between control console 42 and jets 28 indicate that energization of jets 28 is similarly controlled from console 42. Thus, as described hereinabove, the linear induction motor system 30 can be used to drive vehicle 20 under certain circumstances while jets 28 can be used under other circumstances. Further, both linear induction motor system 30 and jets 28 can be used where, for example, load conditions dictate the use of increased power.

Although the invention has been described relative to a preferred embodiment, it will be understood by those skilled in the art that variations and modifications can be effected in this embodiment without departing from the scope and spirit of the invention.

I claim:

1. A transportation system comprising track means comprising at least one substantially tubular track member extending along the length of the right of way to be traversed and including a longitudinal slot in the underside thereof which extends the length of the track; means for supporting said track a predetermined distance above the surface of the earth, at least one vehicle; at least one elongate sled member slidingly disposed within said track for longitudinal movement therein, said sled member having a lower surface substantially conforming in shape to the lower inner surfaces of said track adjacent said slot; means, connected to said sled through said slot and to said vehicle, for supporting said vehicle from said sled; and linear induction motor propulsion means for moving said vehicle along said track.

2. A transportation system as claimed in claim 1 wherein said linear induction motor propulsion means includes a reaction rail supported by the supporting means for said track, and stator means affixed to said vehicle.

3. A transportation system as claimed in claim 2 further comprising jet propulsion means for moving said vehicle along said track.

4. A transportation system as claimed in claim 3 wherein said jet propulsion means comprises tiers of at least two jets arranged on opposite sides of said vehicle.

5. A transportation system as claimed in claim 2 further comprising means for selectively energizing said linear induction motor propulsion means and said jet propulsion means.

6. A transportation system as claimed in Claim 2 wherein said stator means includes first and second stator parts located on opposite sides of said reaction rail.

7. A transportation system comprising track means comprising a pair of spaced, substantially tubular track members extending along the length of the right of way to be traversed and each including a longitudinal slot in the underside thereof which extends the length of the track; means for supporting said track a predetermined distance above the surface of the earth; at least one vehicle; a pair of elongate sled members slidingly disposed within respective one of said tracks for longitudinal movement therein; means, depending from said sleds through said slots and connected to said vehicle, for suspending said vehicle from said sleds; jet propulsion means for moving said vehicle along said track; linear induction motor means for moving said vehicle along said track; and means for selectively energizing said jet propulsion means and said linear induction motor propulsion means so that either or both are energized; said linear induction motor propulsion means comprising a conductive reaction rail which extends the length of the said track parallel thereto and stator means mounted on said vehicle, said rail being positioned between said track members.

8. A transportation system as claimed in claim 7 wherein said reaction rail is mounted on said track supporting means and depends downwardly therefrom, said system including means for insulating said rail from said track supporting means, and said stator means including portions located on opposite sides of said reaction rail.

* * * * *